United States Patent
Otani et al.

(10) Patent No.: US 9,254,872 B2
(45) Date of Patent: Feb. 9, 2016

(54) FRONT VEHICLE-BODY STRUCTURE OF VEHICLE

(71) Applicant: MAZDA MOTOR CORPORATION, Hiroshima (JP)

(72) Inventors: Takahiro Otani, Hiroshima (JP); Kohtaro Sasage, Higashihiroshima (JP); Nobuhiko Hibino, Hiroshima (JP); Yasushi Ishikawa, Hiroshima (JP); Shunsuke Kanemoto, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/191,240

(22) Filed: Feb. 26, 2014

(65) Prior Publication Data
US 2014/0252739 A1    Sep. 11, 2014

(30) Foreign Application Priority Data
Mar. 5, 2013  (JP) ................................ 2013-042768

(51) Int. Cl.
*B62D 21/15*   (2006.01)

(52) U.S. Cl.
CPC ................................. *B62D 21/155* (2013.01)

(58) Field of Classification Search
CPC .................................................... B62D 21/155
See application file for complete search history.

(56) References Cited

U.S. PATENT DOCUMENTS

| 8,267,429 B2 * | 9/2012 | Takeshita et al. ............. 280/784 |
| 8,480,102 B2 * | 7/2013 | Yamada et al. ........ 280/124.109 |
| 8,490,988 B2 * | 7/2013 | Takeshita et al. ...... 280/124.109 |
| 8,746,718 B2 * | 6/2014 | Otani et al. ............ 280/124.109 |
| 2011/0198832 A1 * | 8/2011 | Takeshita et al. ............. 280/784 |

FOREIGN PATENT DOCUMENTS

JP    2011-162158 A    8/2011

* cited by examiner

*Primary Examiner* — Paul N Dickson
*Assistant Examiner* — Joselynn Y Sliteris
(74) *Attorney, Agent, or Firm* — Studebaker & Brackett PC

(57) ABSTRACT

A longitudinal member is configured to transmit a part of a collision load occurring in a vehicle head-on collision to a suspension cross member by way of a front portion, a bending portion, and a rear portion. A lower arm, a portion of which is co-fastened to a vehicle body together with a fastening portion, is configured to transmit another part of the collision load occurring in the vehicle head-on collision to the fastening portion from the front portion. Accordingly, the rear end of the sub frame can be properly detached from the vehicle body in the vehicle head-on collision even in a case in which any weak portion extending in a vehicle width direction may not be provided.

7 Claims, 9 Drawing Sheets

FRONT VEHICLE-BODY STRUCTURE OF VEHICLE

BACKGROUND OF THE INVENTION

The present invention relates to a front vehicle-body structure of a vehicle which comprises a pair of right-and-left front side frames extending substantially in a vehicle longitudinal direction at a front portion of the vehicle and a sub frame provided below the front side frames and supporting a pair of right-and-left suspension lower arms which constitute part of a vehicle suspension.

Conventionally, a structure in which collision energy occurring in a vehicle head-on collision is absorbed by deformation of front side frame is known. Further, a structure in which a sub frame supporting a vehicle suspension, a steering mechanism, a power train and others are provided below the front side frames is known. Herein, the sub frame comprises a sub-frame body portion and a pair of extension portions extending forward from the sub-frame body portion, which functions so as to absorb the collision energy secondarily.

In the structure equipped with the sub frame, it may be preferable that a rear end of the sub frame be detached from a vehicle body during a period from a middle stage to a final stage of the vehicle head-on collision in order not to block the smooth deformation of the front side frame. Accordingly, it is also known to provide a weak portion extending in a vehicle width direction at a specified position of the sub frame which is located just in front of a fastening portion to fasten the rear end of the sub frame, which can bend a portion near the rear end of the sub frame in the vehicle width direction, thereby pulling out a fastening member (bolt) (see Japanese Patent Laid-Open Publication No. 2011-162158).

Herein, it may be considered that the structure equipped with the extension portion of the sub frame for the secondary collision-energy absorption is combined with the structure disclosed in the above-described patent document, which is applied to a small type of vehicle. However, the small type of vehicle generally has a narrow vehicle width, so that an attachment point of a suspension lower arm constituting part of a vehicle suspension to the sub frame is located at an inward position in the vehicle width direction. Accordingly, it may be necessary to configure such that the above-described extension portion of the sub frame circumvents the suspension lower arm.

However, this may cause a problem in that the direction of a collision load occurring in the vehicle head-on collision which is transmitted from the extension portion to the sub-frame body portion slants so greatly inward relative to the vehicle longitudinal direction that a sufficiently-large load enough to bend the portion near the rear end of the sub frame in the vehicle width direction for proper detaching of the sub frame's rear end from the vehicle body could not be transmitted by way of the extension portion.

Moreover, in a case of the small type of vehicle having the narrow vehicle width, a light weight of the vehicle may be especially required by reducing the number of parts reduction or the like. Consequently, a space of the above-described fastening portion of the sub frame may be so limited that the above-described weak portion extending in the vehicle width direction could not be provided properly in some case.

SUMMARY OF THE INVENTION

Accordingly, an object of the present invention is to provide a front vehicle-body structure of a vehicle which can properly detach the rear end of the sub frame from the vehicle body in the vehicle head-on collision even in a case in which any weak portion extending in the vehicle width direction may not be provided.

According to the present invention, there is provided a front vehicle-body structure of a vehicle, comprising a pair of right-and-left front side frames extending substantially in a vehicle longitudinal direction at a front portion the vehicle, and a sub frame provided below the front side frames and supporting a pair of right-and-left suspension lower arms which constitute part of a vehicle suspension, wherein the sub frame comprises a sub-frame body portion extending substantially in a vehicle width direction, a pair of right-and-left extension portions extending forward from the sub-frame body portion below the side frames, and a pair of right-and-left fastening portions projecting outward from a rear end of the sub-frame body portion, each of the extension portions of the sub frame comprises a front portion extending substantially in the vehicle longitudinal direction, a bending portion bending slightly inward at a rear end of the front portion, and a rear portion provided rearward from the bending portion so as to extend obliquely inward relative to the vehicle longitudinal direction, the sub frame is configured to be fastened to a vehicle body at least via the fastening portions by means of a fastening member including bolt and nut, each of the suspension lower arms is arranged in back of the front portion, on an outward side of the rear portion of the extension portion of the sub frame, and in front of the fastening portion of the sub frame, a front end of which is supported at the extension portion of the sub frame by means of a supporting member and a rear end of which is supported at the fastening portion of the sub frame by means of another supporting member, and the bolt and nut of the fastening member for fastening the fastening portions of the sub frame to the vehicle body are commonly used as part of the above-described another supporting member for supporting the rear end of the suspension lower arm such that the rear end of the suspension lower arm is co-fastened to the vehicle body together with the fastening portions of the sub frame by means of the bolt and nut.

According to the present invention described above, while the extension portion operative to transmit the collision load occurring in the vehicle head-on collision by way of the front portion, the bending portion, and the rear portion thereof is configured to circumvent the suspension lower arm, the suspension lower arm operative to transmit the collision load from the front portion of the extension portion to the fastening portion of the sub frame is provided. Thereby, some deformation can be properly generated at the fastening portion of the sub frame by using a difference in direction between the collision load transmitted directly to the sub-frame body portion from the extension portion and the collision load transmitted to the fastening portion by way of the suspension lower arm. Consequently, the rear end of the sub frame can be properly deformed and thereby detached from the vehicle body in the vehicle head-on collision even in a case in which any weak portion extending in the vehicle width direction may not be provided.

Herein, according to a preferred embodiment of the present invention, each of the pair of right-and-left fastening portions of the sub frame has an opening portion where forward and outward sides of the fastening portion are open and a rearward side of the fastening portion is closed. Also, the rear end of the suspension lower arm is supported at the opening portion of the fastening portion of the sub frame so as to be arranged in an inner space of the fastening portion which is formed by an upper member and a lower member of the fastening portion. Further, the above-described another supporting member includes an outer tube to which the rear end of the suspension lower arm is fixed, an inner tube which has a tubular central axis extending substantially in a vehicle vertical direction and is arranged in the inner space of the fastening portion so as to contact inside faces of the upper and lower members of the fastening portion of the sub frame at upper and lower ends thereof, respectively, and a rubber member arranged between the inner tube and the outer tube, and the bolt of the fastening member is configured to be inserted into the inner tube, extending substantially in the vehicle vertical direction, and the nut of the fastening member is configured to be fixed to the vehicle body, whereby the inner tube of the above-described another supporting member provided at the rear end of the suspension lower arm is co-fastened to the vehicle body together with the fastening portion of the sub frame by means of the bolt and nut fastened to each other.

The above-described embodiment can provide preferable specific structures in performing the above-described operations/effects of the present invention effectively.

Further, in the above-described present invention, the extension portion of the sub frame functions so as to transmit a part of a collision load occurring in a vehicle head-on collision to the sub-frame body portion by way of the front portion, the bending portion, and the rear portion such that an input direction of the collision load to the sub-frame body portion is an obliquely-inward direction relative to the vehicle longitudinal direction which is an extension direction of the rear portion, and the suspension lower arm functions so as to transmit another part of the collision load occurring in the vehicle head-on collision to the fastening portion of the sub frame by way of the supported front end of the suspension lower arm, a body of the suspension lower arm, and the supported rear end of the suspension lower arm such that an input direction of the collision load to the fastening portion of the sub frame is substantially the vehicle longitudinal direction.

Moreover, according to another preferred embodiment of the present invention, the sub-frame body portion of the sub frame is formed in a hollow shape so as to have an upper face portion thereof, a lower face portion thereof, and a side face portion thereof, and the pair of fastening portions of the sub frame are configured to project outward from the rear end of the sub-frame body portion such that respective inward ends of the opening portions thereof are located at positions corresponding to respective rear ends of the side face portion which extends substantially in the vehicle longitudinal direction. Also, a low rigidity portion is formed at the sub frame, which is caused by a difference in rigidity which is created by an existence of the side face of the side-frame body portion and the opening portion of the fastening portion, and the low rigidity portion of the sub frame is arranged within an area defined between an imaginary line which interconnects a position around a support point of the front end of the suspension lower arm at the extension portion of the sub frame and the fastening portion of the sub frame and another imaginary line which extends along an extension direction of the rear portion of the extension portion of the sub frame.

The above-described embodiment can make the above-described low rigidity portion cause some deformation occurring at the fastening portion surely. That is, in a case in which the direction of the collision load inputted to the sub-frame body portion from the front portion slants greatly inward relative to the direction of the collision load transmitted to the fastening portion from the front portion by way of the suspension lower arm, for example, a vehicle-width-direction element of the collision load inputted to the sub-frame body portion from the front portion functions so as to make the low rigidity portion cause some deformation occurring at the fas-tening portion surely. Accordingly, the fastening portion of the sub frame can properly deform, so that the rear end of the sub frame can be surely detached from the vehicle body.

Other features, aspects, and advantages of the present invention will become apparent from the following description which refers to the accompanying drawings.

DETAILED DESCRIPTION OF THE INVENTION

Figure 1:
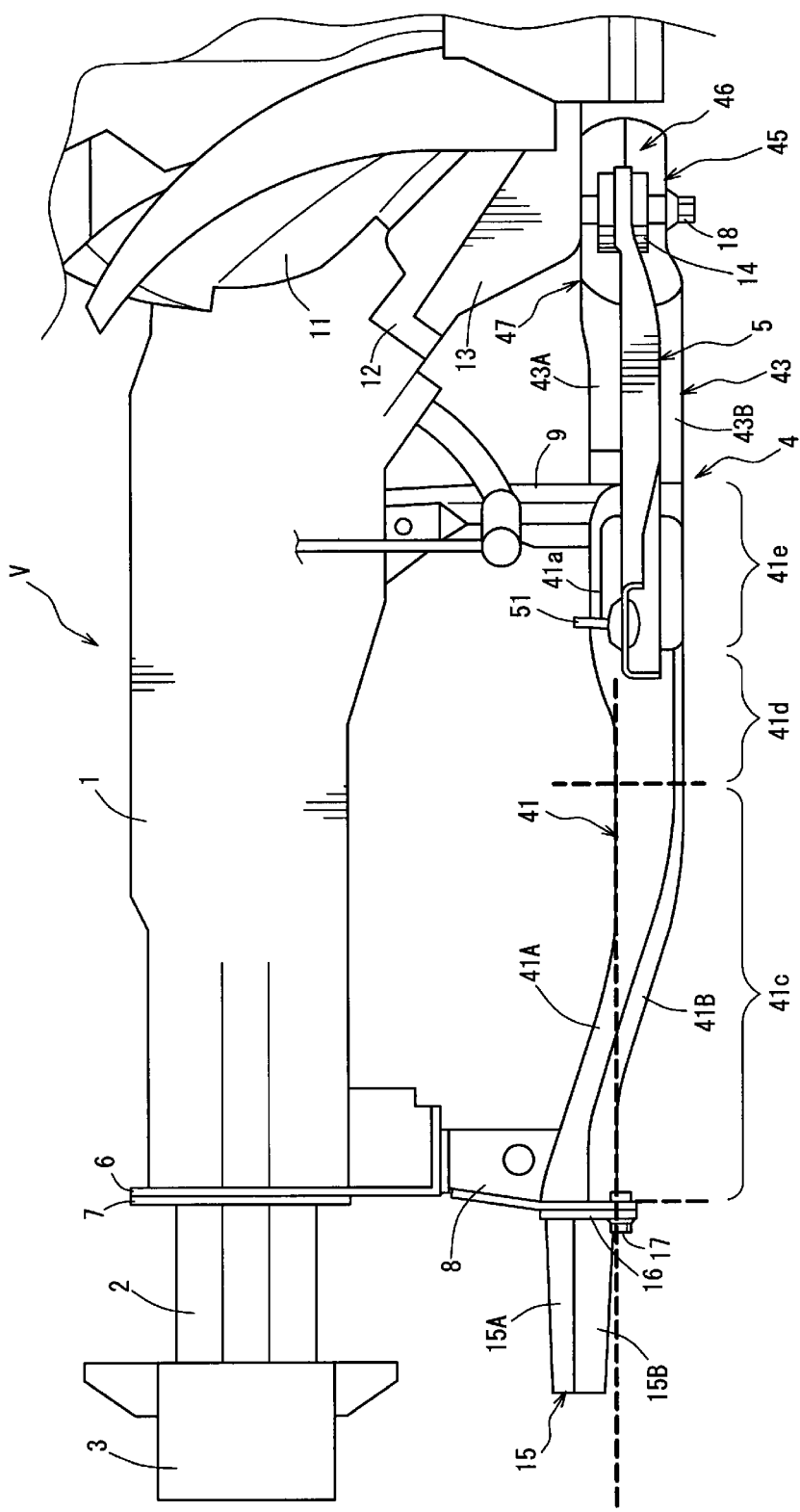
FIG. 1 is a side view showing a front vehicle-body structure of a vehicle according to an embodiment of the present invention.

Hereinafter, an embodiment of the present invention will be described specifically referring to the drawings. FIG. 1 is a side view showing a front vehicle-body structure of a vehicle V according to the embodiment of the present invention. The vehicle V of the present embodiment is a small type of vehicle which has a short front nose. Further, the vehicle V comprises at its front portion, as shown in FIG. 1, a pair of right-and-left front side frames 1 (only its left side is illustrated in FIG. 1) which extend in a vehicle longitudinal direction, upper-side crash cans 2 which are connected to front ends of the front side frames 1, a bumper reinforcement 3 which interconnects the upper-side crash cans 2 in a vehicle width direction, a sub frame 4 which is arranged below the front side frames 1, and a pair of right-and-left lower arms 5 (only its left side is illustrated in FIG. 1) which constitute part of a suspension of the vehicle.

Each of the front side frames 1 is made of a tubal body which extends in the vehicle longitudinal direction and has a closed cross section. An upper-side crash can 2 is attached to a front end of each of the front side frames 1 via a pair of flanges 6, 7.

The upper-side crash can 2 is made of a tubal body which extends in the vehicle longitudinal direction and has a closed cross section, and is connected to a front portion of the front side frame 1. Further, a bumper reinforcement 3 is an arc-shaped member having substantially a trapezoidal closed cross section which is comprised of a bumper reinforcement body (not illustrated) which has a U-shaped cross section opening forward and a closing plate (not illustrated) which is connected to a front portion of the bumper reinforcement body. The bumper reinforcement 3 interconnects both front ends of the right-and-left upper-side crash cans 2 in the vehicle width direction.

Further, to a bottom face of each of the front side frames 1 is joined a front end of a sub frame 4, which will be described below, via a front-end supporting member 8 and the above-described flange 6. Also, a middle portion, in the vehicle longitudinal direction, of the sub frame 4 is connected via a middle supporting member 9 by means of a fastening member 10 (see FIG. 4) as well.

A dash panel 11 which partitions a vehicle compartment from a storage space of a power train, such as an engine, is arranged in back of the front side frame 1, and a rear end of the front side frame 1 is joined to a front face of the dash panel 11. Further, a floor frame 12 which extends longitudinally from the rear end of the front side frame 1 is arranged below the dash panel 11. A gusset 13 which is of a wedge shape in the side view is jointly fixed to a lower portion of the floor frame 12, so that a closed cross section is formed by the floor frame 12 and the gusset 13. A rear end of the sub frame 4 is connected to the floor frame 12 and a gusset 13 via a rear-end supporting member 14.

As shown in FIGS. 1-5, the sub frame 4 is formed in a rectangular shape by a pair of right-and-left longitudinal members 41, a front cross member 42 which interconnects respective front portions of the longitudinal members 41 in the vehicle width direction, and a suspension cross member 43 as a sub-frame body portion which interconnects respective rear ends of the longitudinal members 41 in the vehicle width direction.

The longitudinal member 41 and the suspension cross member 43 are formed in a hollow shape, respectively, by upper members 41A, 43A which constitute their upper faces and lower members 41B, 43B which constitute their lower faces. Herein, the upper members 41A, 43A and the lower members 41B, 43B are joined together. The longitudinal member 41 is made of a tubal body which extends in the vehicle longitudinal direction and has a closed cross section, and an extension portion which extends forward from the suspension cross member 43 is constituted by the longitudinal member 41.

Further, the longitudinal member 41 has a lower-arm attachment portion 41a, which will be described below, at a rear portion thereof. The longitudinal member 41 comprises a front portion 41c which extends rearward from a recess portion 41b formed at a front end thereof, which will be described below, a bending portion 41d which bends slightly inward at a middle position, in the vehicle longitudinal direction, of the longitudinal member 41, and a rear portion 41e which is provided rearward from the bending portion 41d so as to extend obliquely inward relative to the vehicle longitudinal direction. The above-described lower-arm attachment portion 41a is formed at the rear portion 41e.

Figure 2:
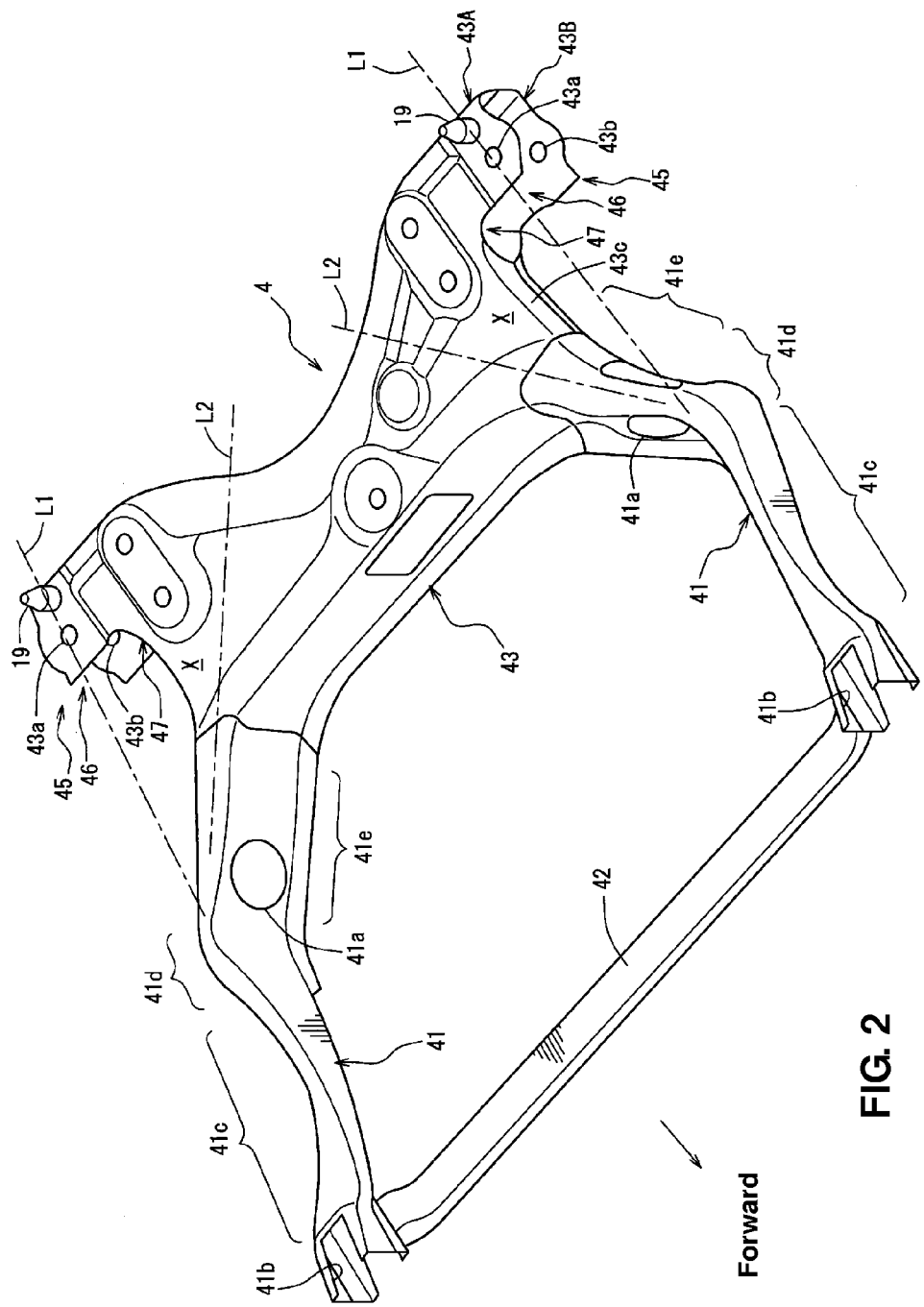
FIG. 2 is a perspective view showing a sub frame.
Figure 3:
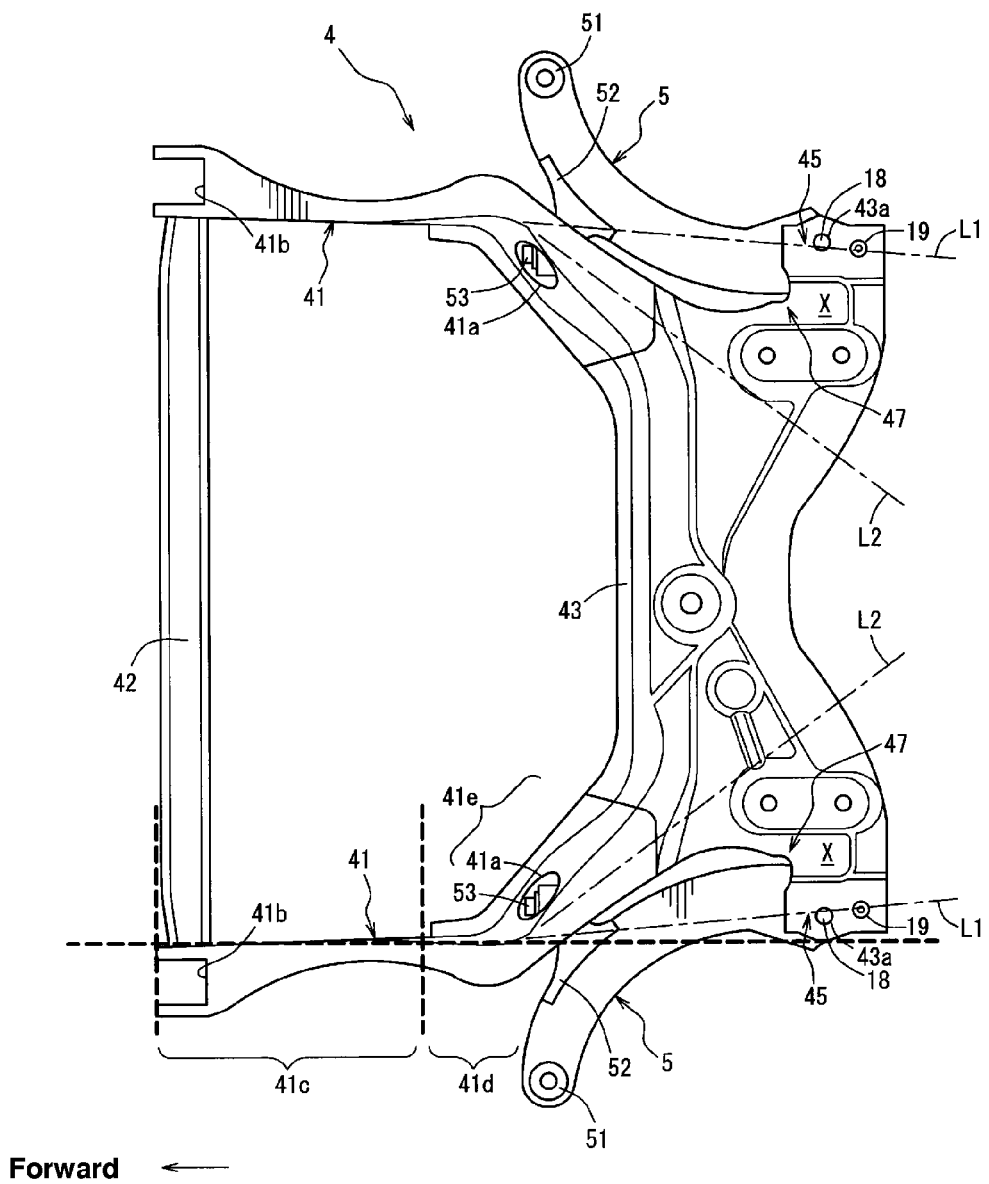
FIG. 3 is a plan view showing the sub frame.

The present embodiment, as shown in FIGS. 1-3, is configured such that a cross section, which is perpendicular to the vehicle longitudinal direction, of a front end of the front portion 41c overlaps, at least partially, a cross section, which is perpendicular to the vehicle longitudinal direction, of a rear end of the front portion 41c in an elevational view. Thus, the front portion 41c is configured such that the above-described cross section of its front end and the above-described cross section of its rear end overlap each other at least partially in a vehicle vertical direction.

Moreover, a front end of the longitudinal member 41 of the sub frame 4 is formed in a U shape in a plan view as shown in FIGS. 2 and 3. The front-end supporting member 8 is jointly fixed to the recess portion 41b formed at a central portion of the front end of the longitudinal member 41. A lower-side crash can 15 is attached to a lower portion of the front-end supporting member 8 via a plate-shaped flange 16 as shown in FIG. 1.

The lower-side crash can 15 is formed in a quadrangular-pyramid shape by an upper member 15A which constitutes its upper face and a lower member 15B which constitutes its lower face. Respective rear ends of these members 15A, 15B are jointly fixed to the flange 16. Herein, the flange 16 is fastened to a front face of the front-end supporting member 8 by a fastening member 17, so that the lower-side crash can 15 is attached to the front-end supporting member 8 via the flange 16. Thereby, the lower-side crash can 15 is configured to deform in a compressive manner when receiving a collision load inputted from the vehicle front.

The suspension cross member 43 (the sub-frame body portion) has a pair of fastening portions 45 at its rear end, and each of the pair of fastening portions 45 is fastened to the gusset 13 by means of a bolt 18 which constitutes a fastening member.

The fastening portion 45 is configured as shown in FIGS. 1-5 such that the upper member 43A and the lower member 43B of the suspension cross member 43 project outward in the vehicle width direction, and has an opening portion 46 where its forward and outward sides are open and its rearward side is closed, which is formed between the upper and lower members 43A, 43B. Further, a pair of holes 43a, 43b, into which the bolt 18 is to be inserted and which are positioned vertically, are formed at the upper and lower members 43A, 43B at the fastening portion 45 as shown in FIG. 2.

The suspension cross member 43 further has, at a position thereof which is located in front of the fastening portion 45, a bending portion 43c (which corresponds to a side face portion of the suspension cross member 43 which extends substantially in the vehicle longitudinal direction) which is formed by part of the upper member 43A which is bent downward. A lower end of the bending portion 43c is joined to the lower member 43B.

Herein, a difference in rigidity which is created by an existence of the bending portion 43c and the opening portion 46 occurs in a corner area between the bending portion 43c and the fastening portion 45. That is, there is provided a relatively low rigidity portion 47 at a base (inward) portion of the fastening portion 45 projecting outward.

Thus, the fastening portion 45 is configured to project outward from the rear end of the suspension cross member 43 such that an inward end of the opening portion 46 is located at a position corresponding to a rear end of the bending portion 43c. And the low rigidity portion 47 is formed at the sub frame 4, which is caused by the difference in rigidity which is created by the existence of the bending portion 43c of the suspension cross member 43 and the opening portion 46 formed at the fastening portion 45.

The low rigidity portion 47 is, as shown in FIGS. 2 and 3, arranged within an area X defined between an imaginary line L1 which interconnects a position around a support point of the front end of the lower arm 5 at the longitudinal member 41 and the fastening portion 45 and another imaginary line L2 which extends along an extension direction of the rear portion 41e of the longitudinal member 41.

Further, a positioning pin 19 is formed at a portion of the fastening portion 45 which is located in back of the holes 43a, 43b. The positioning pin 19 projects upward and has a tip formed substantially in a cone shape, which extends toward the gusset 13.

Figure 4:
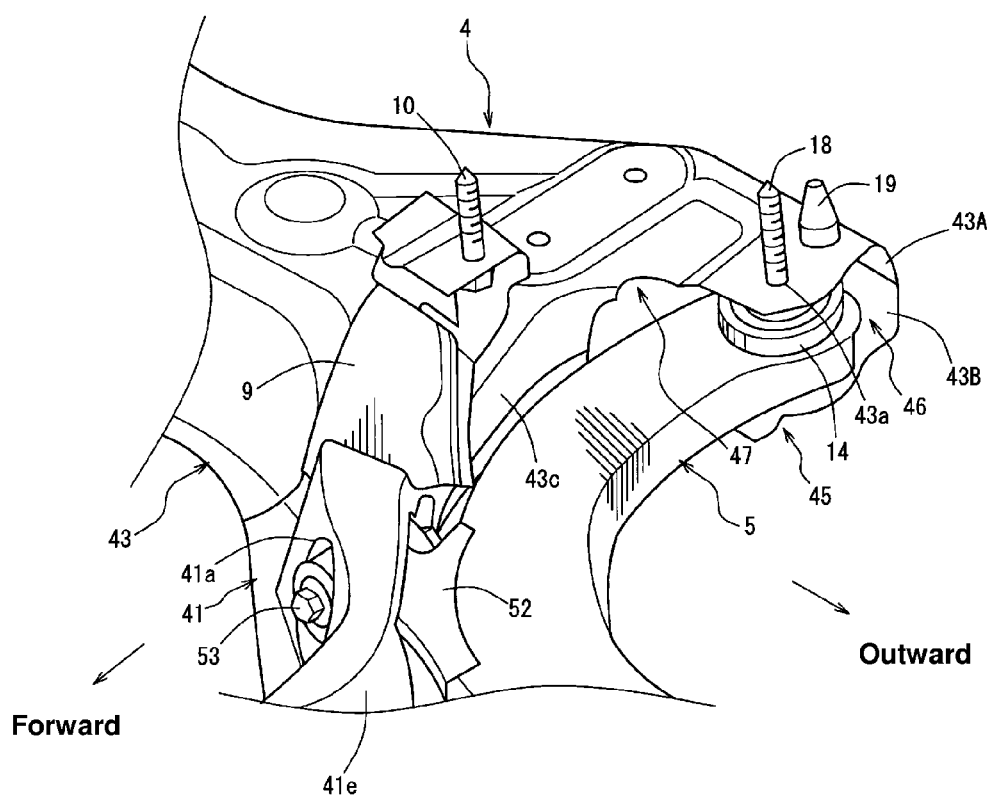
FIG. 4 is a major-part enlarged view showing a rear end of the sub frame.

Herein, the lower arm 5 is configured substantially in a curve shape such that its body portion projects inward as shown in FIGS. 3 and 4, which is attached at a position which is located on an outward side of the rear portion 41e and in back of the front portion 41c. The longitudinal member 41, which is comprised of the above-described front portion 41c, bending portion 41d, and rear portion 41e, is configured to circumvent the curve-shaped lower arm 5.

The lower arm 5 has a ball joint 51 at its front end which is connected to a knuckle arm (not illustrated) to support a wheel as shown in FIGS. 1 and 3. The lower arm 5 further has a support arm 52 at its central portion in the vehicle longitudinal direction which is configured to project inward as shown in FIGS. 3 and 4. The support arm 52 has a front connection portion 53 at its tip which is pivotally supported at a lower-arm attachment portion 41a which is formed at the rear portion 41e.

The lower arm 5 is arranged at the position located on the outward side of the rear portion 41e and in back of the front portion 41c, and extends rearward from the front connection portion 53. A rear end of the lower arm 5 is, as shown in FIGS. 3-5, supported at the opening portion 46 of the fastening portion 45 so as to be arranged in an inner space of the fastening portion 45 which is formed by the upper member 43A and the lower member 43B.

Figure 5:
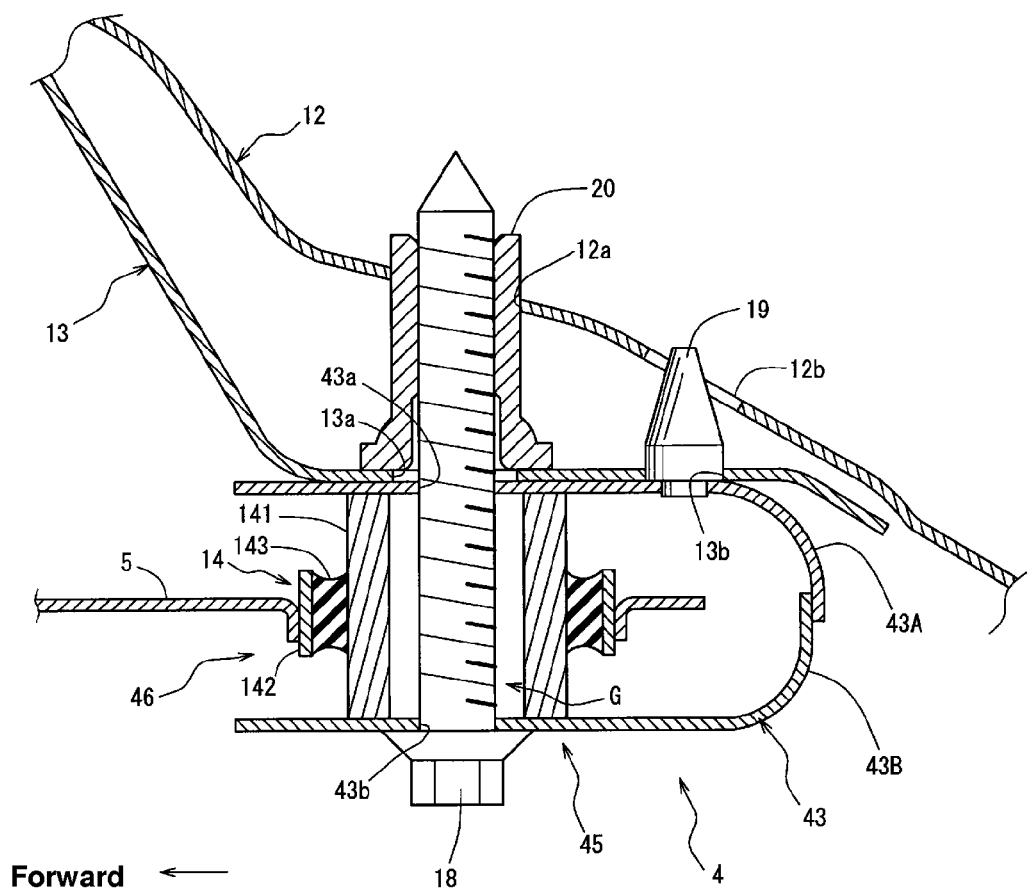
FIG. 5 is a sectional view showing a fastening portion.

A rear-end support member 14 is attached to the rear end of the lower arm 5 as shown in FIGS. 1, 4 and 5. The rear-end supporting member 14 is, as shown in FIG. 5, comprised of an outer tube 142 to which the rear end of the lower arm 5 is fixed, an inner tube 141 which has a tubular central axis extending substantially in the vehicle vertical direction and is arranged in the inner space of the fastening portion 45 so as to contact inside faces of the upper and lower members 43A, 43B of the fastening portion 45 at its upper and lower ends, respectively, and a ring-shaped rubber member 143 arranged between the inner tube 141 and the outer tube 142. The inner tube 141 is arranged such that its inner space portion overlaps the above-described holes 43a, 43b in the vertical direction.

Figure 6:
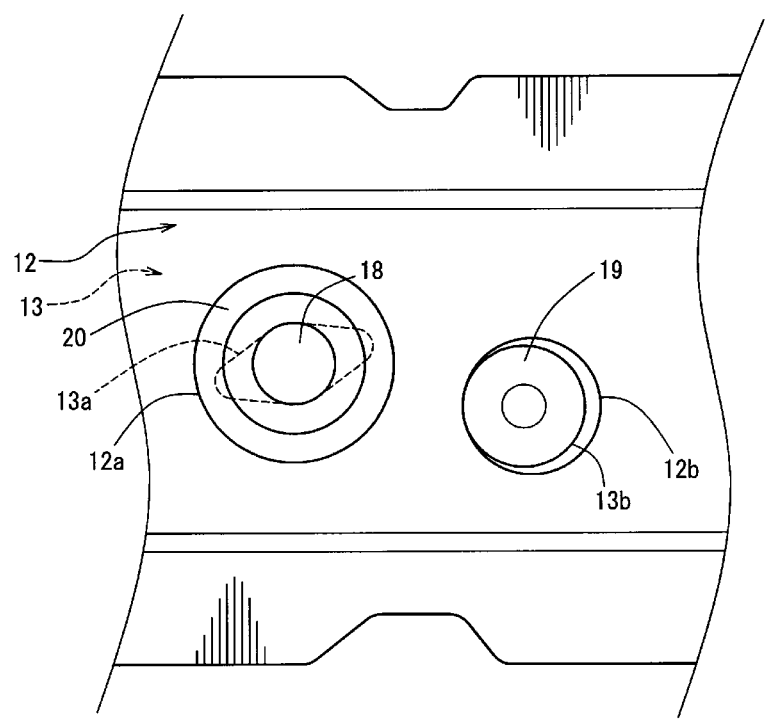
FIG. 6 is a plan view showing a portion of a vehicle body where the fastening portion is fastened.

On the vehicle-body side, a hole 13a which has a long-hole shape and slants obliquely relative to the vehicle longitudinal direction is formed at a specified position of a lower face of the gusset 13 which corresponds to the inner space portion of the inner tube 141 and the holes 43a, 43b as shown in FIGS. 5 and 6. Likewise, a hole 12a is formed at the floor frame 12. A pipe-shaped weld nut 20, which constitutes a fastening member together with the bolt 18, is inserted into the hole 12a. The weld nut 20 is fixed by a lower face of the gusset 13 and the hole 12a of the floor frame 12 such that its seat face is arranged around the hole 13a.

In the present embodiment, the bolt 18 is inserted into the holes 13a, 43a, 43b and also the inner space portion of the inner tube 141 of the rear-end supporting member 14 and then fastened to the weld nut 20, so that the rear end of the lower arm 5 is co-fastened to the vehicle body together with the fastening portion 45. Thus, in a co-fastening fixation state of the fastening portion 45 and the vehicle body, the rear end of the lower arm 5 is resiliently supported at the fastening portion 45 by means of the rubber member 143 of the rear-end supporting member 14.

Herein, the hole diameter of the inner space portion of the inner tube 141 is set to be greater than the bolt diameter of the bolt 18, so that a gap G is formed between the inner tube 141 and the bolt 18 as shown in FIG. 5 in the above-described co-fastening fixation state.

Further, an open hole 12b and a positioning hole 13b are formed at respective positions of the floor frame 12 and the gusset 13 which correspond to the positioning pin 19 as shown in FIGS. 5 and 6.

The hole diameter of the positioning hole 13b is set to be substantially equal to the diameter of the positioning pin 19, so that the positioning hole 13b engages with the positioning pin 19 fitly with substantially no gap in the above-described co-fastening fixation state. Accordingly, in the present embodiment the above-described gap G is set to be greater than the gap between the positioning hole 13b and the positioning pin 19.

The positioning pin 19 and the positioning hole 13b function as means for positioning the sub frame 4 relative to the vehicle body. Specifically, when the sub frame 4 is attached to the vehicle body, the positioning pin 19 is inserted into the positing pin 13b of the gusset 13 positioned on the vehicle-body side, whereby positioning of the fastening portion 45 relative to the vehicle body can be conducted, so that positioning of the sub frame 4 relative to the vehicle body can be properly achieved.

Figure 8:
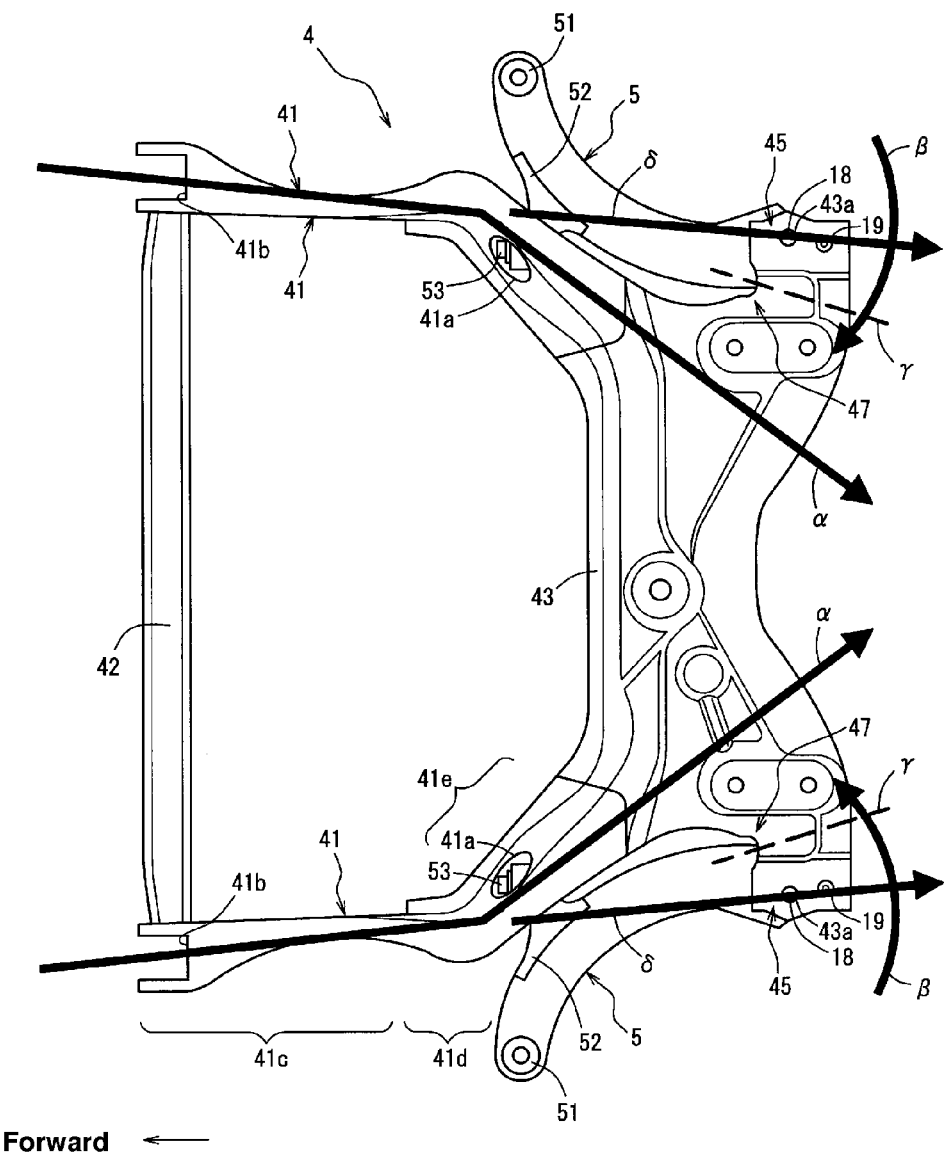
FIG. 8 is a plan view showing transmission directions of collision load occurring in the vehicle head-on collision.
Figure 9:
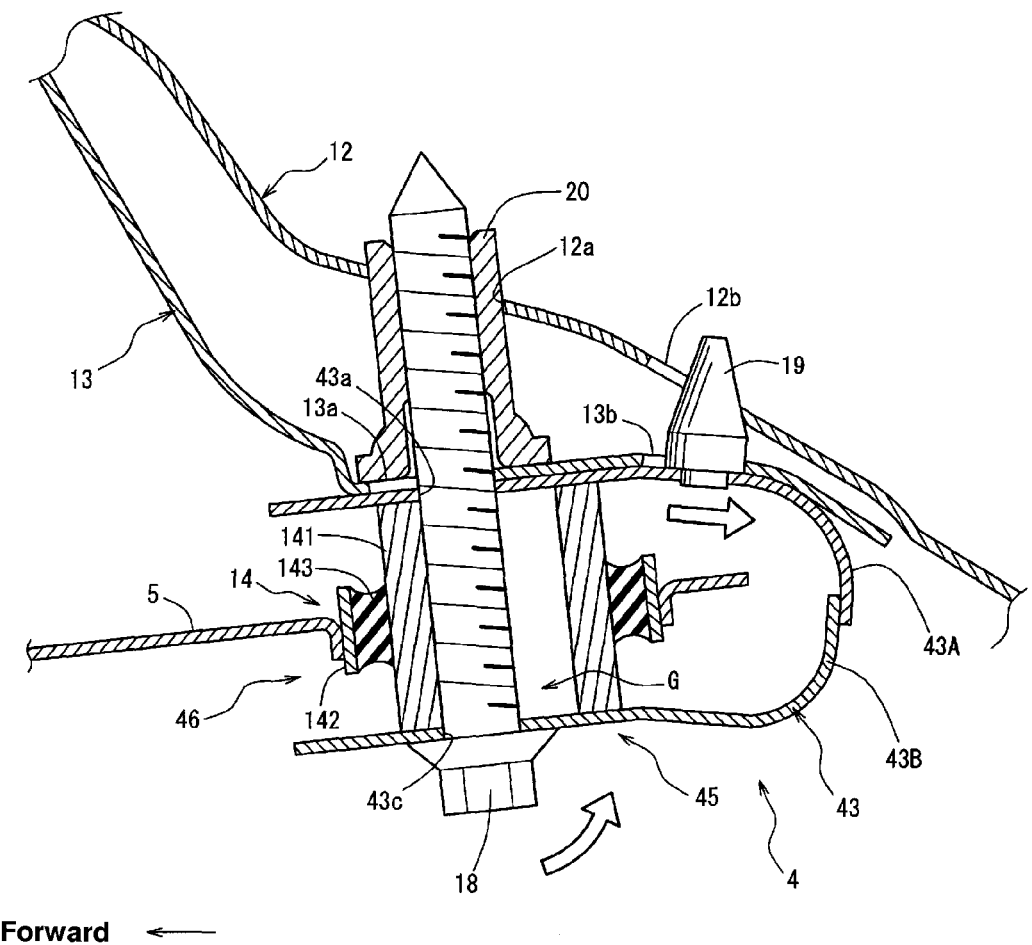
FIG. 9 is a sectional view showing the results of analysis of deformation movements of the sub frame occurring in the vehicle head-on collision.

Hereinafter, the deformation movements of the sub frame 4 which occur in the head-on collision of the vehicle V according to the present embodiment will be described referring further FIGS. 7-9. The inventors of the present invention conducted a CAE analysis on the deformation movements of the sub frame 4 occurring in the head-on collision of the vehicle V in developing the front vehicle-body structure shown in FIGS. 1-6. FIGS. 7A-C-9 show results of the analysis of deformation movements of the sub frame 4 which occur in a case of the vehicle V having the head-on collision. FIGS. 7A-C are perspective views showing an initial stage, a middle stage, and a final stage of the collision, respectively. FIG. 8 is a plan view showing transmission directions of the collision load occurring in the head-on collision of the vehicle V. FIG. 9 is a sectional view showing the middle stage of the collision. In FIGS. 7A-C, illustration of the fastening member 10 operative to fasten the middle supporting member 9 is omitted.

First, in the initial stage just after occurrence of the head-on collision of the vehicle V, the upper-side crash can 2 provided at the front end of the front side frame 1 deforms in a compressive manner. Then, part of the collision load which has not be absorbed by this compressive deformation of the upper-side crash can 2 is inputted to the front side frame 1. At this moment, the front side frame 1 is compressed axially by the above-described collision load, so that collision energy is absorbed mainly by the axial compression of the front side frame 1.

Figure 7A:
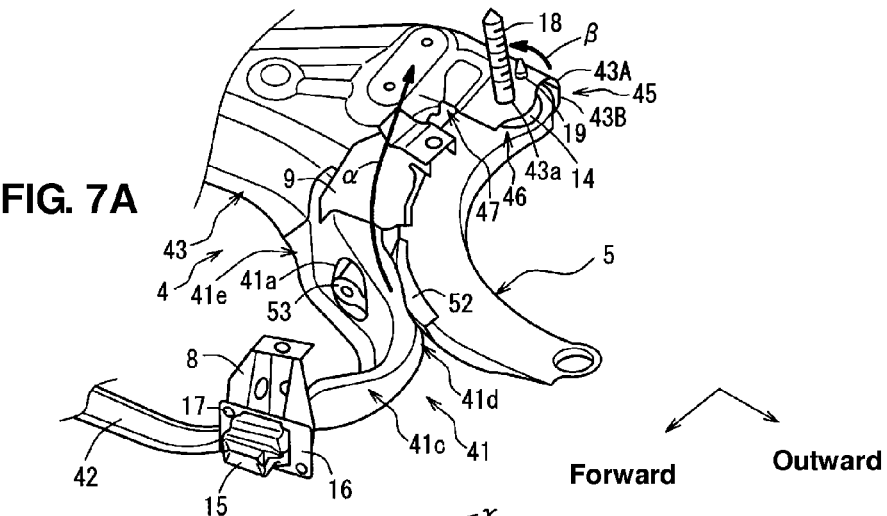
FIGS. 7A, 7B and 7C are perspective views showing results of analysis of deformation movements of the sub frame occurring in a vehicle head-on collision.

Meanwhile, as shown in FIG. 7A, the collision load causes a compressive deformation of the lower-side crash can 15 provided at the front end of the sub frame 4 (the longitudinal member 41). Then, part of the collision load which has not be absorbed by this compressive deformation of the lower-side crash can 15 is inputted to the sub frame 4. At this moment, since the above-described cross section of the front end and the above-described cross section of the rear end of the front portion 41c are configured to overlap each other at least partially in the vertical direction, the front portion 41c deforms in the compressive manner as shown in FIG. 7A. Consequently, the collision-energy is absorbed secondarily by the axial compression of the front portion 41c.

As the front portion 41c deforms in the compressive manner as described above, the above-described collision load is transmitted to the suspension cross member 43 by way of the front portion 41c, the bending portion 41d, and the rear portion 41e of the longitudinal member 41 as shown by a bold arrow α in FIGS. 7A-C and 8. Herein, the collision load transmitted to the suspension cross member 43 from the front portion 41c flows along the imaginary line L2 shown in FIGS. 2 and 3. The angle of this collision-load flow slants inward relative to the vehicle longitudinal direction, so that the above-described collision load is transmitted to a position which is located inward from the low rigidity portion 47.

Further, the relatively large load acts on the rear end of the sub frame 4 including the low rigidity portion 47 from the vehicle front because of the axial compression of the front portion 41c, so that a valley-shaped bending deformation shown in the figures occurs at the low rigidity portion 47. And, since the angle of the collision load transmitted to the suspension cross member 43 from the front portion 41c slants inward relative to the vehicle longitudinal direction and thereby the above-described collision load is transmitted to the position located inward from the low rigidity portion 47, a rotational moment shown by a bold arrow β in FIGS. 7A-C and 8 occurs at the rear end of the sub frame 4.

The above-described rotational moment is caused by a lateral element, in the vehicle width direction, of the collision load shown by the bold arrow α, which becomes the one capable of rotating the rear end of the sub frame 4 inward around the fastening portion 45. The rotational moment can promote the above-described valley-shaped bending deformation. Herein, the valley-shaped bending deformation of the low rigidity portion 47 causes the fastening portion 45 to deform such that it inclines forward as shown in FIGS. 7A-C and 9.

Figure 7B:
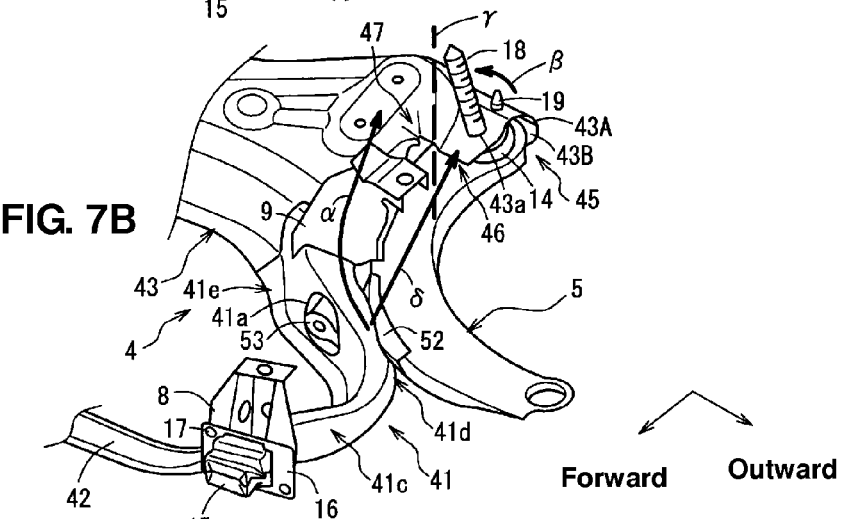
Figure 7C:
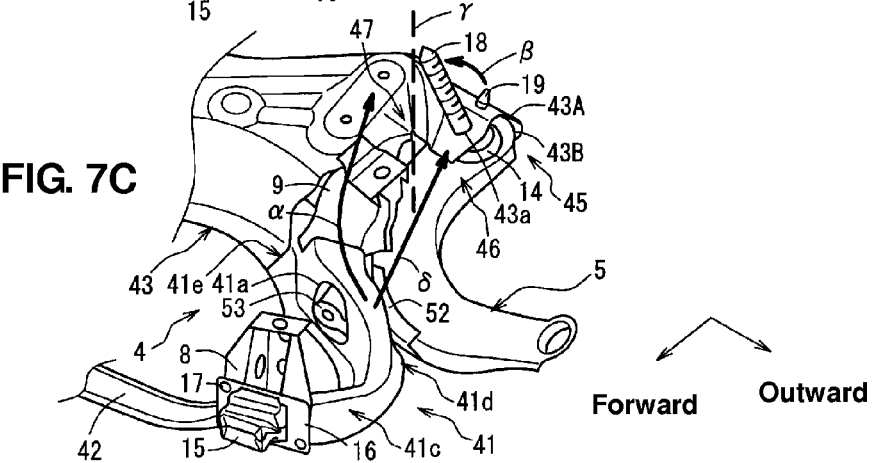

When the collision of the vehicle V progresses further, the axial compression of the whole part of the longitudinal member 41 including the front portion 41c progresses as shown in FIG. 7B. Also, the valley-shaped bending deformation along a bending line extending obliquely relative to the vehicle longitudinal direction shown by a broken line y in FIGS. 7B, 7C and 8 progresses at the low rigidity portion 47, whereby the above-described forward-inclination deformation of the fastening portion 45 is further promoted.

Then, in the middle stage of the collision shown in FIG. 7B, the lower arm 5 contacts the rear portion 41e (the lower-arm attachment portion 41a) according to the axial compression of the longitudinal member 41. Thereby, part of the collision load is transmitted to the fastening portion 45 from the front portion 41c by way of the lower arm 5 (specifically, by way of the lower arm's front support portion, arm body portion, and rear support portion) as shown by a bold arrow δ in FIGS. 7A-C and 8. Herein, the collision load transmitted to the fastening portion 45 from the front portion 41c by way of the lower arm 5 flows along the imaginary line L1 shown in FIGS. 2 and 3, so that this flow direction of the collision load is substantially the vehicle longitudinal direction.

At this moment, the bolt 18 and the positioning pin 19 provided at the fastening portion 45 are pushed rearward by the forward inclination of the fastening portion 45 and the impact load rearward transmitted by way of the lower arm 5. In the present embodiment, since the gap G is formed between the bolt 18 and the inner tube 141 of the rear-end supporting member 14, the fastening portion 45 including the inner tube 141 is movable rearward as shown in FIG. 8. Also, because of the friction occurring between the inner tube 141 and the upper and lower members 43A, 43B of the suspension cross member 43, the fastening portion 45 moves rearward according to the rearward move of the inner tube 141.

Accordingly, the positioning pin 19 moves rearward, expanding the positioning hole 13b of the gusset 13 as shown in FIG. 8. Then, the positioning pin 19 comes to contact a front portion of the inner tube 141.

When the positioning pin 19 expands the positioning hole 13b as described above, the support rigidity of a portion of the gusset 13 around the hole 13a which is located near the positioning hole 13b decreases considerably.

At this moment, since the fastening portion 45 deforms so as to incline forward, there occurs the rotational moment to move the lower end of the bolt 18 upward and rearward. Accordingly, the bolt 18 and the weld nut 20 start rotating such that their lower end portions move rearward and upward.

As the collision of the vehicle V further progresses, the above-described collision load transmitted to the fastening portion 45 from the front portion 41 by way of the lower arm 5 increases further. Accordingly, as shown in FIG. 7C, the valley-shaped bending deformation of the lower rigidity portion 47 and the forward inclination of the fastening portion 45 are promoted, and thereby the rotation of the bolt 18 and the weld nut 20 are promoted. Consequently, a contact point of the rear end of the sub frame 4 and the gusset 13 becomes a fulcrum, so that a torsional load operative to pull out the bolt 18a and the weld nut 20 downward and rearward is generated by the so-called action of leverage.

Herein, since the support rigidity of the portion around the hole 13a has decreased by the positioning pin 19 expanding the positioning hole 13b of the gusset 13 at this point, if the above-described torsional load acts, the hole 13a deforms and expands so greatly along its longitudinal direction. Consequently, in the final stage of the collision, the bolt 18 and the weld nut 20 are pulled out so as to pass through the hole 13a completely or some peripheral portion around the hole 13a are torn off, so that the rear end of the sub frame 4 can be detached from the vehicle body (the floor frame 12 and the gusset 13).

The inventor have found from their diligent researches and the analysis results shown in FIGS. 7A-C-9 that the rear end of the sub frame 4 can be detached from the vehicle body properly without providing the weak portion extending in the vehicle width direction which is disclosed in the above-described patent document. That is, detaching of the rear end of the sub frame from the vehicle body can be achieved surely, without any particular weak portion extending in the vehicle width direction, by utilizing the two flows of collision load: i.e., one is the flow passing by way of the lower arm 5 having its front end supported at the extension portion (the longitudinal member 41) of the sub frame 4 and its rear end supported at the fastening portion 45 of the sub frame 4 (see the arrow δ in FIGS. 7A-C and 8); the other is the flow passing by way of the extension portion (the longitudinal member 41) circumventing the lower arm 5 (see the arrow α in FIGS. 7A-C and 8).

As described above, according to the present embodiment, while the extension portion (the longitudinal member 41) operative to transmit the collision load occurring in the head-on collision of the vehicle V by way of the front portion 41c, the bending portion 41d, and the rear portion 41e is configured to circumvent the lower arm 5, the lower arm 5 operative to transmit the collision load from the front portion 41c to the fastening portion 45 is provided. Thereby, some deformation can be properly generated at the fastening portion 45 by using the difference in direction between the collision load transmitted directly to the suspension cross member 43 from the longitudinal member 41 and the collision load transmitted to the fastening portion 45 by way of the lower arm 5. Consequently, the rear end of the sub frame 4 can be properly deformed and thereby detached from the vehicle body in the head-on collision of the vehicle V even in a case in which any weak portion extending in the vehicle width direction may not be provided.

Further, the low rigidity portion 47 is formed within the area defined between the imaginary line L1 and the imaginary line L2. Thereby, in a case in which the direction of the collision load inputted to the suspension cross member 43 from the front portion 41c (the direction of the imaginary line L2) slants greatly inward relative to the direction of the collision load transmitted to the fastening portion 45 from the front portion 41c by way of the lower arm 5 (the direction of the imaginary line L1), for example, the vehicle-width-direction element of the collision load inputted to the suspension cross member 43 from the front portion 41c functions so as to make the low rigidity portion 47 cause deformation occurring at the fastening portion 45 surely. Accordingly, the fastening portion 45 can properly deform, so that the rear end of the sub frame 4 can be surely detached from the vehicle body.

Herein, while the above-described embodiment comprises the rectangular-shaped sub frame 4, the shape of the sub frame is not be limited to this, and a sub frame having substantially a H shape, for example, is applicable as well.

The low rigidity portion 47 is not limited to the one of the above-described embodiment which is caused by the difference in rigidity which is created by the existence of the bending portion 43c constituting the side face portion of the suspension cross member 43 and the opening portion 46 of the fastening portion 45. For example, the low rigidity portion may be configured by forming a bead, slit or the like which extends in the vehicle longitudinal direction at a position located adjacent to the fastening portion 45.

The suspension lower arm of the present invention corresponds to the lower arm 5 of the above-described embodiment. Likewise, the vehicle body corresponds to the floor frame 12 and the gusset 13, the sub-frame body portion corresponds to the suspension cross member 43, the extension portion corresponds to the longitudinal member 41, and the fastening member corresponds to the bolt 18 and the weld nut 20.

The present invention should not be limited to the above-described embodiment, and any other modifications or improvements may be applied within the scope of a spirit of the present invention.

What is claimed is:

1. A front vehicle-body structure of a vehicle, comprising
   a pair of right-and-left front side frames extending substantially in a vehicle longitudinal direction at a front portion the vehicle; and
   a sub frame provided below the front side frames and supporting a pair of right-and-left suspension lower arms which constitute part of a vehicle suspension,
   wherein said sub frame comprises a sub-frame body portion extending substantially in a vehicle width direction, a pair of right-and-left extension portions extending forward from the sub-frame body portion below the side frames, and a pair of right-and-left fastening portions projecting outward, in the vehicle width direction, from a rear end of the sub-frame body portion,
   each of said extension portions of the sub frame comprises a front portion extending substantially in the vehicle longitudinal direction, a bending portion bending slightly inward at a rear end of the front portion, and a rear portion provided rearward from the bending portion so as to extend obliquely inward relative to the vehicle longitudinal direction,
   said sub frame is configured to be fastened to a vehicle body at least via said fastening portions by means of a fastening member including bolt and nut, each of the fastening portions having a bolt hole into which the bolt of the fastening member is inserted,
   each of said suspension lower arms is arranged in back of said front portion, on an outward side of said rear portion of the extension portion of the sub frame, and in front of said fastening portion of the sub frame, a front end of said suspension lower arm is supported at the extension portion of the sub frame by means of a supporting member, and a rear end of said suspension lower arm is supported at the fastening portion of the sub frame by means of another supporting member, and
   said bolt and nut of the fastening member for fastening the fastening portions of the sub frame to the vehicle body are commonly used as part of said another supporting member for supporting the rear end of the suspension lower arm such that the rear end of the suspension lower arm is co-fastened to the vehicle body together with the fastening portions of the sub frame by means of said bolt and nut, and said bolt hole of the fastening portion is located on an outward side, in the vehicle width direction, relative to a side end face of the sub-frame body portion, whereby a collision load occurring in a vehicle head-on collision is transmitted to the fastening portion from the extension portion by way of the sub-frame body portion and part of said collision load is transmitted to the fastening portion from the extension portion by way of the suspension lower arm, bypassing the sub-frame body portion.

2. The front vehicle-body structure of a vehicle of claim 1, wherein each of said pair of right-and-left fastening portions of the sub frame has an opening portion where forward and outward sides of the fastening portion are open and a rearward side of the fastening portion is closed.

3. The front vehicle-body structure of a vehicle of claim 2, wherein said rear end of the suspension lower arm is supported at said opening portion of the fastening portion of the sub frame so as to be arranged in an inner space of the fastening portion which is formed by an upper member and a lower member of the fastening portion.

4. The front vehicle-body structure of a vehicle of claim 3, wherein said another supporting member includes an outer tube to which the rear end of the suspension lower arm is fixed, an inner tube which has a tubular central axis extending substantially in a vehicle vertical direction and is arranged in said inner space of the fastening portion so as to contact inside faces of the upper and lower members of the fastening portion of the sub frame at upper and lower ends thereof, respectively, and a rubber member arranged between the inner tube and the outer tube, and
   said bolt of the fastening member is configured to be inserted into said inner tube, extending substantially in the vehicle vertical direction, and said nut of the fastening member is configured to be fixed to said vehicle body,
   whereby the inner tube of said another supporting member provided at the rear end of the suspension lower arm is co-fastened to the vehicle body together with the fastening portion of the sub frame by means of said bolt and nut fastened to each other.

5. The front vehicle-body structure of a vehicle of claim 2, wherein said sub-frame body portion of the sub frame is formed in a hollow shape so as to have an upper face portion thereof, a lower face portion thereof, and a side face portion thereof, and
   said pair of fastening portions of the sub frame are configured to project outward from the rear end of the sub-frame body portion such that respective inward ends of said opening portions thereof are located at positions corresponding to respective rear ends of said side portion which extend substantially in the vehicle longitudinal direction.

6. The front vehicle-body structure of a vehicle of claim 5, wherein a low rigidity portion is formed at said sub frame, which is caused by a difference in rigidity which is created by an existence of said side face portion of the side-frame body portion and said opening portion of the fastening portion, and said low rigidity portion of the sub frame is arranged within an area defined between an imaginary line which interconnects a position around a support point of the front end of the suspension lower arm at the extension portion of the sub frame and said fastening portion of the sub frame and another imaginary line which extends along an extension direction of said rear portion of the extension portion of the sub frame.

7. The front vehicle-body structure of a vehicle of claim 1, wherein a low rigidity portion which has a relatively low rigidity is formed at said sub frame, and said low rigidity portion of the sub frame is arranged within an area defined between an imaginary line which interconnects a position around a support point of the front end of the suspension lower arm at the extension portion of the sub frame and said fastening portion of the sub frame and another imaginary line which extends along an extension direction of said rear portion of the extension portion of the sub frame.

* * * * *